(12) United States Patent
Clodic et al.

(10) Patent No.: US 8,123,200 B2
(45) Date of Patent: Feb. 28, 2012

(54) METHOD AND SYSTEM FOR SUPPLYING WATER TO COOLING TOWERS

(75) Inventors: Denis Clodic, Paris (FR); Assaad Zoughaib, Rambouillet (FR); Michele Merchat, Vincennes (FR); Larbi Fassi, Garches (FR)

(73) Assignee: Climespace, Paris (FR)

( * ) Notice: Subject to any disclaimer, the term of this patent is extended or adjusted under 35 U.S.C. 154(b) by 1122 days.

(21) Appl. No.: 11/629,009

(22) PCT Filed: May 31, 2005

(86) PCT No.: PCT/FR2005/050398
§ 371 (c)(1),
(2), (4) Date: Jul. 31, 2007

(87) PCT Pub. No.: WO2005/124253
PCT Pub. Date: Dec. 29, 2005

(65) Prior Publication Data
US 2009/0139575 A1    Jun. 4, 2009

(30) Foreign Application Priority Data

Jun. 8, 2004 (FR) ..................................... 04 51128

(51) Int. Cl.
*B01F 3/04* (2006.01)
(52) U.S. Cl. .............................. 261/112.1; 261/DIG. 11
(58) Field of Classification Search .................. 261/97, 261/110, 112.1, 154, DIG. 11
See application file for complete search history.

(56) References Cited

U.S. PATENT DOCUMENTS

| | | | | |
|---|---|---|---|---|
| 910,207 A | * | 1/1909 | Keep | 261/97 |
| 1,246,704 A | * | 11/1917 | Boeckem | 261/108 |
| 1,905,422 A | * | 4/1933 | Rasmussen | 261/112.1 |

(Continued)

FOREIGN PATENT DOCUMENTS

| FR | 2 279 057 | 2/1976 |
|---|---|---|
| FR | 2 431 670 | 2/1980 |

OTHER PUBLICATIONS

Ragland, et al., "Two-phase flow at the flooding point in an annulus," Experimental Thermal and Fluid Science, 2:1: 7-16 (Jan. 1989).

(Continued)

*Primary Examiner* — Charles Bushey
(74) *Attorney, Agent, or Firm* — IM IP Law PLLC; C. Andrew Im

(57) ABSTRACT

The present invention relates to a method and a system for controlling the circulation of water films on the exchange walls of an exchange surface of a cooling tower. It comprises combining a tank and a dispenser lip to ensure that the film has a specific thickness and that it adheres to the exchange wall right from the moment it starts to flow and repeatedly so, on each exchange wall. The exchange walls between air and water are horizontally sloping at a small angle, thereby ensuring that the water flows by force of gravity and, at the same time, limiting the speed increase on the plate to avoid the droplets from being pulled away by the airflow. The water films are recovered in recovery troughs perpendicular to the flow of the water films on the plates. These troughs are tilted horizontally, and enable the recovery of the water films without being crossed by the air flows. The air is blown in by nozzles which are interposed between the water flow plates in such a way that the airflow is in a counter-current flow or, if necessary, in a cross-current flow, relative to the water films thus enabling the evaporation of the water that cools the water flow on the exchange plates without forming liquid aerosols.

15 Claims, 3 Drawing Sheets

U.S. PATENT DOCUMENTS

Figure 1:
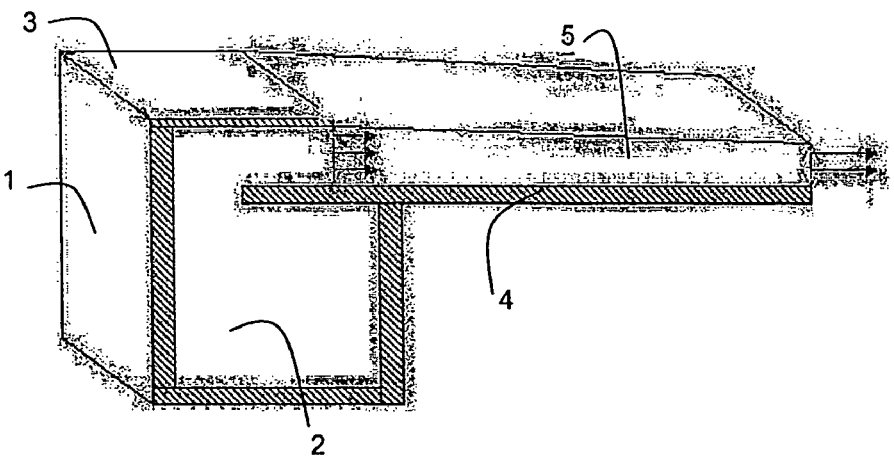

| | | | | |
|---|---|---|---|---|
| 2,645,607 | A | * | 7/1953 | Allen ............................ 196/111 |
| 2,733,055 | A | * | 1/1956 | Ophuls et al. ................... 261/24 |
| 3,628,776 | A | * | 12/1971 | Raseley .......................... 261/73 |
| 3,917,764 | A | * | 11/1975 | Phelps ........................... 261/111 |
| 4,009,229 | A | * | 2/1977 | Szucs et al. ................... 261/72.1 |
| 4,256,674 | A | * | 3/1981 | Shafranovsky et al. ... 261/112.1 |
| 5,215,043 | A | * | 6/1993 | Tsutsumi ........................ 122/39 |
| 5,333,573 | A | * | 8/1994 | Tsutsumi ........................ 122/39 |
| 6,604,493 | B1 | * | 8/2003 | Toki ................................ 122/40 |
| 6,869,066 | B2 | * | 3/2005 | Koo ........................... 261/112.2 |

OTHER PUBLICATIONS

Tso et al., "Air-Water Countercurrent Flow Limits INA Vertical Pipe Filled With Spheres," Experimental Thermal and Fluid Science, 1:2: 207-219 (Apr. 1988).

* cited by examiner

METHOD AND SYSTEM FOR SUPPLYING WATER TO COOLING TOWERS

CROSS-REFERENCE TO RELATED APPLICATIONS

This application is a §371 from PCT/FR2005/050398 filed May 31, 2005, which claims priority from FR 04/51128 filed Jun. 8, 2004, each of which is herein incorporated by reference in its entirety.

BACKGROUND OF THE INVENTION

The invention relates to a method and system for supplying water to cooling towers.

Cooling towers are compact, energy-efficient devices for rejecting heat into the ambient air. The essential physical process is that of water evaporation in air that is distant from its moisture saturation conditions to an extent that varies according to local climatic conditions. Since the latent heat of water is very high, i.e. in the range of 2500 kJ/kg under atmospheric pressure, a low evaporation rate is needed to cool the flow of circulating liquid water. It has been known since 1976 that cooling towers may be a source of vectorization of pathogenic bacteria such as legionella. This vectorization takes place through liquid aerosols with a well-defined size ranging from 0.5 to 6 micrometers, i.e. 0.5 to 6 $10^{-6}$ m. Accordingly, an object of the present invention is to define a method and a system by which it is possible to eliminate these aerosols or micro-droplets.

PRIOR ART

Cooling towers are generally equipped with various devices to eliminate droplet drift such as the droplet drift eliminators presented for example in the U.S. Pat. No. 3,731,461 or the UK patent No. 2,206,683, each of which is incorporated herein by reference in its entirety. However, the measuring means used to measure the size of the aerosols and their number are recent and not well known or, in the case of some of them, difficult to implement. Only recent devices using white light diffraction at 90 degrees can be used to count both the populations of droplets and their size, which is placed at the outlet of the cooling towers. The manufacturers communicate the drift level in terms of percentage of the circulating water flow rate; typical values range from 0.01% to 0.06%. This appears to be low but, when seen in relation to the circulating flow rate, there are several tens of liters per hour that are sent out in the form of aerosols having a size of some microns, representing values of more than several billions of micro-droplets per hour. Such numbers have been measured at the outlet of cooling towers provided with droplet eliminator systems. The devices are not efficient in stopping micro-droplets sized between 0.5 and 6 micrometers. The present invention therefore seeks to deal with the problem at source in preventing the very formation of liquid aerosols. To this end, the present invention proceeds upon the desirability of developing a novel and comprehensive design for the flow of air and water in cooling towers.

The cooling tower is formed chiefly by a water distribution system, a packing consisting of exchange surfaces for putting air and water into contact, a ventilation system and a water recovery system.

The usual or improved devices, as presented in the U.S. Pat. No. 4,579,692 or WO 99/30096 or WO 94/21366 (each of which is incorporated herein by reference in its entirety) for the distribution of water on the packing are spray devices, rotating booms or overflow systems that shed water onto the packing. All these systems have the major defect of generating aerosols even before the water flows onto the packing. Furthermore, in being concerned solely with increasing the air-water contact surface, certain patents such as the U.S. Pat. No. 2,517,639 or No. 3,652,066 (each of which is incorporated herein by reference in its entirety) even claim an increase in the number of droplets formed by various devices to increase the air/water contact surface.

SUMMARY OF THE INVENTION

To prevent the formation of liquid aerosols or micro-droplets for either cross-flow or counter-flow circulation of air and water in cooling towers, this formation of liquid aerosols is prevented on three successive portions of the flow of water in relation to the airflow: during the distribution of water, during the flow of water on the exchange surface and during the recovery of water at the end of the exchange surface or packing. The term packing is taken here in its broader sense of a solid surface providing for the efficient contact of water and air.

To this end, the present invention generates a film of water that adheres to the wall of the packing, in checking the thickness and proper distribution on the surface. This is a first step in preventing the formation of micro-droplets. Then, it is necessary to check the water flow regime on the exchange surface so that the height of the wavelets that form on this free-boundary flow is low enough for the wavelets not to be clipped by the airflows. Finally, the water films should be recovered without being crossed by airflows.

The initial distribution of water on the surface is essential so as not to create aerosols of variable sizes during this distribution. The method devised as an embodiment of the invention is a method using overflow with controlled thickness and with film adhering to the wall.

Once the water film of homogeneous thickness has been distributed throughout the width of the plate, the tilt of the plate, its surface condition, its hydrophilic properties or, on the contrary, its hydrophobic properties will determine the speed of water on the plate in conjunction with co-current or cross-current airflow circulation. Indeed, the water circulates by gravity and hence its motion is uniformly accelerated by gravity. This acceleration needs to be controlled to limit the increase in the speed of water on the surface which leads to the formation of wavelets. The Wallis criterion is used to compute the relative speed thresholds of air and water leading to the pulling away of the droplets by the relationship $U_G^* + m \sqrt{U_L^*} = C$ where $U^*$ is the non-dimensional speed, the indices G and L respectively designate air and water and m is an empirically determined parameter that depends on the surface condition of the exchange surfaces. The value of C makes it possible to know whether or not the droplet pull-away conditions are fulfilled. Other more sophisticated computations taking account of the surface tension of the water, the gravity, the wavelength of the wavelets, certain thermo-physical properties of air and water and of course their speeds similarly lead to defining the droplet pull-away conditions. These computations and experimental devices have been used to verify the basis of the invention.

The present invention relates to a method for supplying water to a cooling tower in which the supply is done by means of an anti-turbulence water tank and a means such as a dispenser lip, wherein films of water adhering to the exchange surfaces are generated in order to prevent the formation of liquid aerosols during the exchange between air and water on these surfaces.

In accordance with an exemplary embodiment of the present invention, the exchange surfaces or plates are tilted by an angle, for example ranging from 2° to 10°, relative to horizontal, the value of this angle being such that the acceleration of the water film on the exchange surfaces is controlled so that the speed of the film adhering to the surfaces prevents the clipping of the wavelets by the counter-current or cross-current air flows.

According an exemplary embodiment of the present invention, blower air nozzles are provided, comprising troughs inclined for example by an angle of 1° to 2° in a plane perpendicular to the flow of the water film in order to collect this film without its being broken by the airflow, thus preventing the formation of droplets during the recovery of the water films after they had been cooled by auto-evaporation in the airflows.

To ensure constant thickness of the water film on the plates or exchange surfaces, in one embodiment the number of surfaces provided with water depends on the water flow rate. In this case, the supplied surfaces are, for example, each subjected to the same flow rate.

The invention also relates to a method for the production of water cooled by means of a cooling tower using a water distribution system and at least one exchange surface between a water flow and an airflow in which the water distribution system generates a flow in the form of a water film applied to the exchange surface, the values of thickness of the water film and of the relative speed of the water flow in relation to the airflow being chosen to prevent the formation of liquid aerosols during the exchange between the air and the water on these surfaces.

Figure 2:
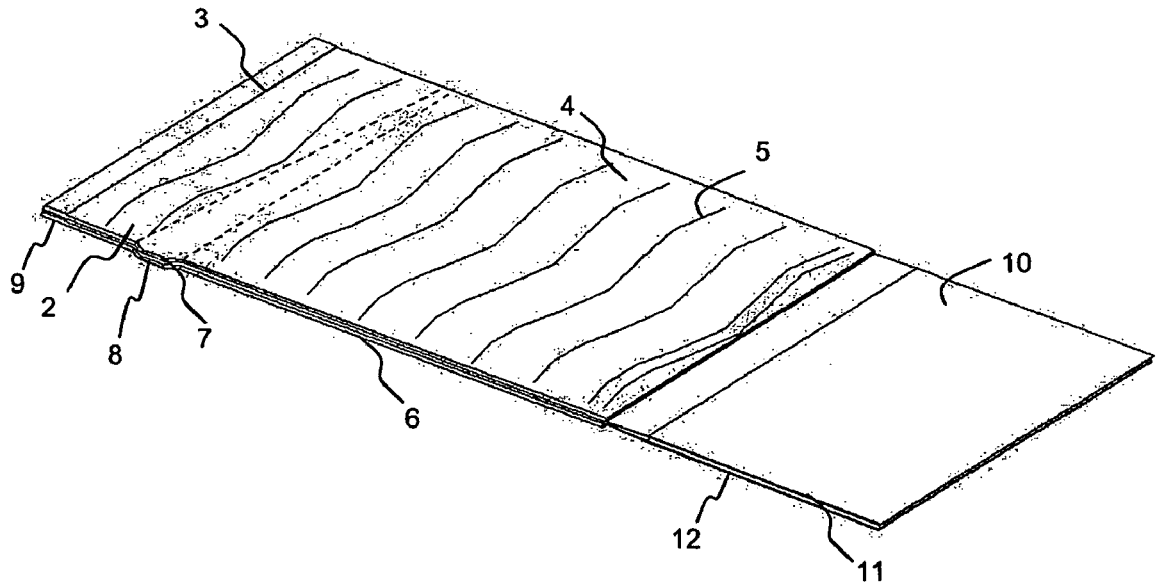

According to an exemplary embodiment of the present invention, the distribution of water is obtained through overflow, by a distribution means providing for a homogeneous distribution of the water film throughout the width of the exchange surface.

In accordance with an exemplary embodiment of the present invention, the water distribution system comprises an anti-turbulence water tank.

In accordance with an exemplary embodiment of the present invention, the exchange surface or plate is tilted by an angle, for example ranging from 2° to 10° relative to the horizontal, the value of this angle being such that the relative speed of the flow of water in relation to the airflow remains below a threshold value starting from which aerosols get created.

According to an exemplary embodiment of the present invention, the maximum speed $U_L$* of the water film is determined by the formula:

$$U_G^* + m\sqrt{U_L^*} = C,$$

where $U_G$* is the speed of the airflow, m is a parameter that is a function of the exchange surface, and C is the value of the Wallace criterion beyond which aerosols get created. The airflow is for example generated by a distribution system situated at one of the ends of the exchange surface.

In accordance with an exemplary embodiment of the present invention, there are provided troughs inclined, for example, by an angle of 1° to 2°, in a plane perpendicular to the flow of the water film in order to collect this water film, without this film being in contact with the airflow, thus preventing the formation of droplets during the recovery of the water films after they have been cooled by auto-evaporation in the airflows.

In accordance with an exemplary embodiment of the present invention, to ensure constant thickness of the water film on the plates or exchange surfaces, the number of surfaces provided with water depends on the water flow rate. In this case, the surfaces supplied are for example each subjected to the same flow rate.

The flow of the water film is preferably laminar.

Other features and advantages of the invention should appear from the description of some of its embodiments, made with reference to the appended figures of which FIGS. 1 to 7 are diagrams illustrating embodiments of the invention.

BRIEF DESCRIPTION OF THE DRAWINGS

The following detailed description, given by way of example, and not intended to limit the present invention solely thereto, will best be understood in conjunction with the accompanying drawings in which like components or features in the various figures are represented by like reference numbers:

FIG. 1 depicts a schematic view of a cross-section of the water distribution system in accordance with an exemplary embodiment of the present inventions;

FIG. 2 is a comprehensive view of two superimposed exchange plates in accordance with an exemplary embodiment of the present invention;

FIG. 3 is a view of the plate forming a first angle horizontally in the x, y plane in accordance with an exemplary embodiment of the present invention, FIG. 4 is a partial and detailed view of the ends of the plates in accordance with an exemplary embodiment of the present invention;

FIG. 5 is a view the plate forming an angle horizontally in the y, z plane in accordance with an exemplary embodiment of the present invention;

FIG. 6 illustrates the plates in accordance with an exemplary embodiment of the present invention; and FIG. 7 illustrates a sectional view of the set of plates in accordance with an exemplary embodiment of the present invention.

DESCRIPTION OF AN EMBODIMENT

This detailed description made with reference to the figures will provide for a clear understanding of the invention. In accordance with an exemplary embodiment of the present invention, FIG. 1 gives a schematic view of a cross-section of the water distribution system 1 which will be used for supplying each elementary exchange surface of the packing such as the surface 4. The anti-movement water tank 2 receives a fraction of the total water flow. Its dimensions and structure provide for an undisturbed flow that is properly distributed throughout the width of the elementary plate of the packing. The water comes out of this water tank to a dispenser lip 3. The aperture and the length of this dispenser lip 3 enable precise control of the thickness of the water film 5 which is between some tenths of a millimeter and one millimeter. The association of the water tank 2 and of the dispenser lip 3 enables the distribution of the requisite fraction of the water flow over the exchange surface 4 throughout its width and with a defined thickness.

In accordance with an exemplary embodiment of the present invention, FIG. 2 provides a comprehensive view of two superimposed exchange plates, 4 and 6, with the respective supplies from the water tanks 2 and 9 which, in this implementation, are integrated into the thickness of the exchange plates 4 and 6. The exchange plates 4 and 6 typically have a thickness of the order of 5 mm. The water tanks 2 and 9 then have a thickness of the order of 3 mm and the water film is poured with a controlled thickness on the plate for by the dispenser lip 3. FIG. 2 also shows one of the possible designs of the shape of the water tank 2 having a section that is gradually reduced in the direction of the water supply 7 to provide for an equally shared initial distribution of the water flow throughout the width of the plate 4. The association of the water tanks and of the dispenser lips on all the exchange plates of the packing provide for the supply of the water by a film that adheres to the exchange wall. This distribution system ensures the absence of formation of aerosols during the distribution of water.

FIG. 2 also shows a distribution element 10 formed by two thin plates 11 and 12 that terminate in a conical shape to direct the airflow in parallel to the water flow and in a counter-current flow, in this case on the plate 6. A cross-current supply of the air is also possible and would have the same structure for water distribution using a water tank and dispenser lip and air distribution using interposed nozzles. However, as is well known, cross-current supply systems have lower energy efficiency. Advantageously, beehive structures, not shown, may be inserted into the mid-layer element of the distribution plates, forming the air distribution system to obtain an essentially one-directional, eddy-free airflow.

Figure 3:
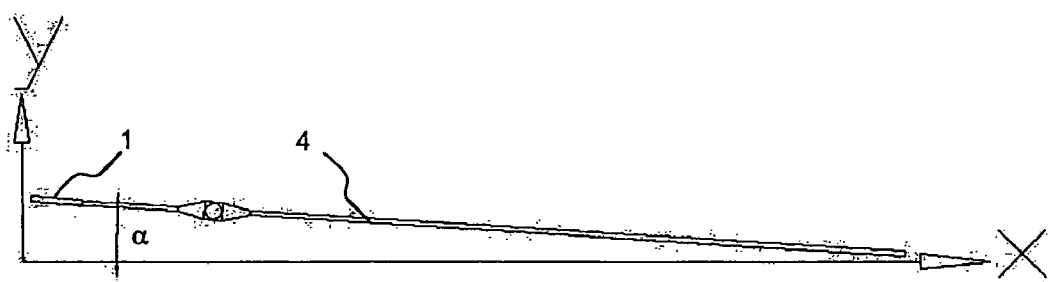

In an orthonormal reference system x,y,z where x is the horizontal axis in the direction of flow of water on the plate, y is the vertical axis and z is the axis that forms a succession of horizontal planes with x, the plates form a first angle α between 2° and 10° and preferably around 5° above the horizontal, in the plane x, y as shown in FIG. 3, in such a way that the water supply system 1 formed by the water tanks and the dispenser lips is higher than the ends of the plates where the air is blown in by the air distribution structure. For a typical plate length of 1.7 m, the difference in level between the top and the bottom of the plate 4 is therefore about 15 cm enabling the speed of the water to be only twice as high at the bottom of the plate as the initial speed at the outlet from the distribution lip 3. This control of the effect of acceleration of gravity on the water film is essential to maintain a slightly a rippled flow with a Reynold number below 1000 defining a flow regime in which the wavelets are low enough on the vertical so that they are not clipped by the airflow, thereby preventing the formation of droplets and aerosols.

Figure 4:
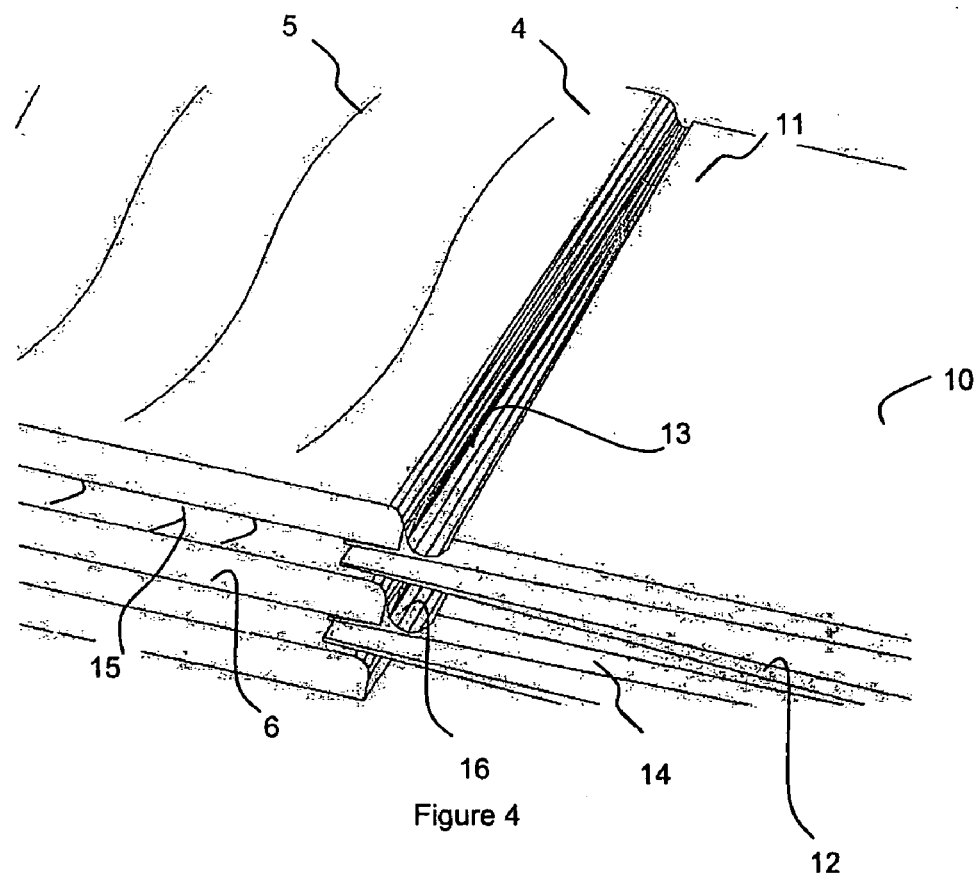
Figure 5:
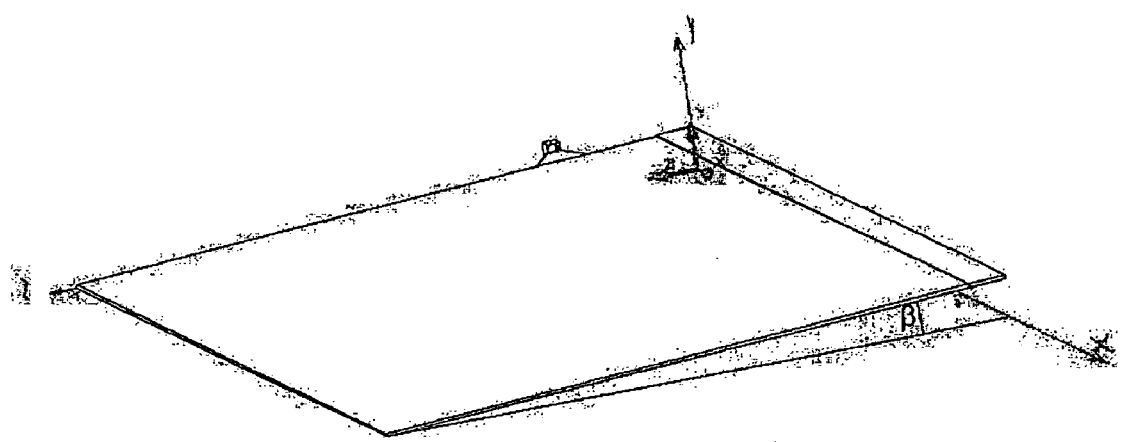

In accordance with an exemplary embodiment of the present invention, FIG. 4 is a partial and detailed view of the ends of the plates 4 and 6 on which the water films 5 and 15 flow, and of the plates 11 and 12 which are elements of the device 10 for the distribution of air in a counter-current flow with respect to the water film 5. It can be seen that the end of the plates 4 and 6 is rounded to prevent turbulence during the change of direction of the water film. The plate 11 has a trough 13 which collects the water flow in a film 5 that has flowed on the plate 4. This trough may advantageously have a section that increases in the direction of the slope y, z. Indeed, as shown in FIG. 5, the plate also form an angle β of about 1° to 2° to the horizontal, this time in the plane y, z. This slope enables the recovery of each elementary water flow flowing on each plate without crossing the airflow, thus preventing any formation of droplets by the blowing of air through the water flow. This principle of generalizing this water recovery system is shown in FIG. 4 where the plate 14 of the water distribution system itself also comprises a trough 16 used to recover the flow of water in a film 15.

Figure 6:
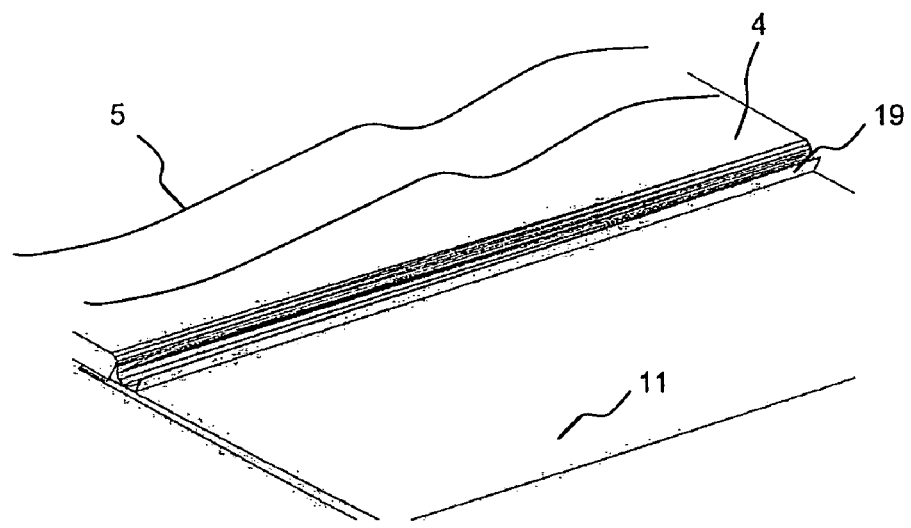

Another exemplary embodiment of the present invention is shown in FIG. 6: to avoid a case where the plates have two slopes, one in the plane x, y and the other in the plane y,z, only the slope in the plane x,y is kept and a part 19 is attached to the plate 11 and leans on the edge of the exchange surface 4. This attached part 19 forms a trough inclined in the plane y,z. Furthermore, the section of the trough is gradually wider in the direction of the slope to take account of the increase in the flow associated with the gradual recovery of the water film 5. For practical reasons, this trough 19 may be integrated into the plate 11 itself at the end of the course.

Figure 7:
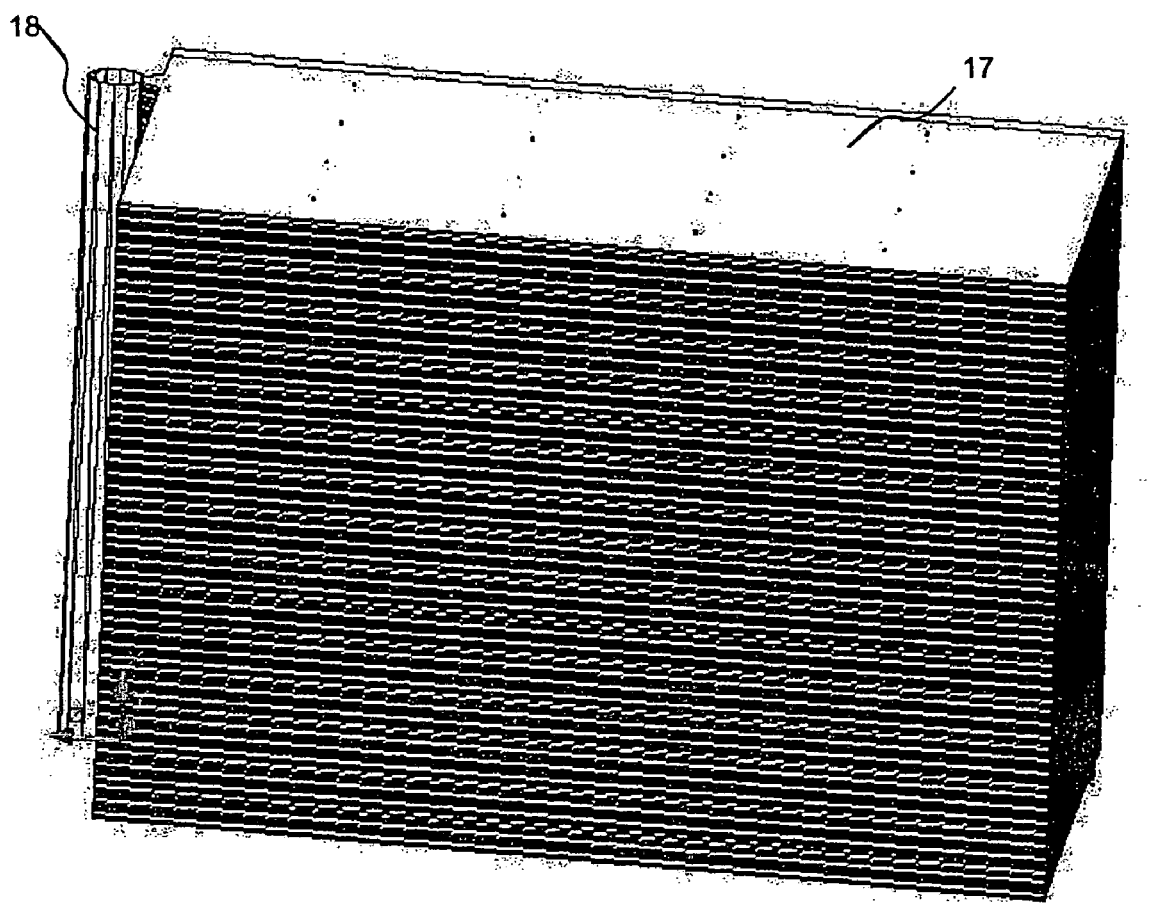

In accordance with an exemplary embodiment of the present invention, FIG. 7 shows a sectional view of the set of plates forming the packing 17 with one of the water supply tubes 18 which supplies the inlets of the water tanks such as for example the inlets 7 and 8 shown in FIG. 2. Advantageously, several tubes, not shown, of the same type as the tubes 18 may be positioned to alternately supply one in every two plates or one in every three plates or more if necessary. This provides the following advantages: ease in the making of water inlet tap connections on the supply tubes and above all the possibility of regulating the water flow rate of the tower without modifying the thickness of the film. Indeed, for a nominal water flow rate representing 100% of the flow, all the exchange surfaces are supplied by all the supply tubes. If the tower has three supply tubes and if the water flow rate has to be reduced by one-third, then one of the three supply tubes is closed by an ad hoc valve and one-third of the plates are no longer supplied with water. The other two-thirds are supplied with the same unit flow rate as earlier, thus making it possible to keep the same parameters of setting for the dispenser lips and hence making it possible to have an even film on each of the plates supplied.

In short, the invention relates to a method and system used to control the flow of water films on the exchange walls of an exchange surface of a cooling tower by the association of a water tank and a dispenser lip ensuring that the film or films have a defined thickness and adhere to the exchange walls as soon as the flow of the film or films begins, this being achieved repetitively on each exchange wall.

In the example, exchange walls between air and water are inclined to the horizontal by a small angle, for example ranging from 2° to 10°, thus ensuring the flow of water by gravity and at the same time limiting the increase in speed on the plates so as to: (a) prevent the increase in the speed on the plate to; and (b) prevent the droplets from being pulled away by the airflow.

The recovery of the water films is done in recovery troughs perpendicular to the flow of the films of water on the plates. These troughs are inclined to the horizontal by an angle equal, for example, to 1° to 2° and are used to recover the water films without being crossed by air flows.

Their air is blown in by nozzles interposed between the successive water-flow plates in such a way that the air circulates in a counter-current or, if necessary, in a cross-current with respect to the water films and thus enables the evaporation of the water which cools the water flow on the plates.

The invention claimed is:

1. A device for supplying water inside a cooling tower, comprising:
   an exchange surface on which water flows;
   a water tank; and
   a dispenser lip connected to the water tank and positioned in front of an upper portion of the exchange surface and approximately parallel to an end portion of the exchange surface, the water being supplied from the water tank to the exchange surface between the dispenser lip and said end portion of the exchange surface; and
   wherein the exchange surface is tilted horizontally so that the water flows away from said end portion of the exchange surface.

2. The device of claim 1, wherein a distance between the dispenser lip and the exchange surface is between two tenths of a millimeter and one millimeter.

3. The device of claim 1, wherein the exchange surface is tilted horizontally by an angle to provide a water flow having a Reynold number below 1000.

4. A cooling tower comprising a plurality of devices for supplying water of claim 1 and means for supplying water to a plurality of water tanks, and wherein for each one of said water tanks supplied with water, a water film adhering to a respective exchange surface is generated between a respective dispenser lip and the respective exchange surface by the water coming from a respective water tank.

5. The cooling tower of claim 4, wherein the exchange surfaces or plates are tilted horizontally by an angle between 2° and 10°.

6. The cooling tower of claim 4, wherein the exchange surfaces or plates are tilted horizontally by an angle to provide a water flow having a Reynold number below 1000.

7. The cooling tower of claim 5, wherein said angle is determined so that a maximum speed $U_L^*$ of the water film is determined by the formula:

$$U_G^* + m\sqrt{U_L^*} = C,$$

where $U_G^*$ is the speed of the airflow, m is a parameter that is a function of the exchange surface, and C is the value of the Wallace criterion beyond which aerosols get created.

8. The cooling tower of claim 4, wherein the means for supplying water to the plurality of water tanks are adapted to supply water to a number of water tanks depending on a water flow rate inside the cooling tower.

9. The cooling tower of claim 4, wherein the exchange surfaces supplied with water are each subjected to same flow rate.

10. The cooling tower of claim 4, further comprising means to generate an airflow on a surface of the water films.

11. The cooling tower of claim 10, wherein the airflow is generated by a distribution system situated at one of the ends of the exchange surfaces.

12. The cooling tower of claim 4, comprising inclined troughs in a plane perpendicular to a flow of the water film to collect the water film after it has been cooled by evaporation on the respective exchange surface.

13. The cooling tower of claim 12, wherein the troughs are inclined horizontally by an angle of 1° to 2°.

14. The cooling tower of claim 12, further comprising, for each device for supplying water, blower air nozzles comprising said inclined troughs.

15. A method for supplying water to a cooling tower, comprising the steps of supplying the water from a water tank to an exchange surface between a dispenser lip and an end portion of the exchange surface, the dispenser lip being connected to the water tank;

positioning the dispenser lip in front of an upper portion of the exchange surface and approximately parallel to the end portion of the exchange surface so that the water enters the exchange surface under the dispenser lip, thereby preventing the formation of liquid aerosol at the upper portion of the exchange surface; and tilting horizontally the exchange surface so that the water flows away from the end portion of the exchange surface.

\* \* \* \* \*